United States Patent Office 3,065,281
Patented Nov. 20, 1962

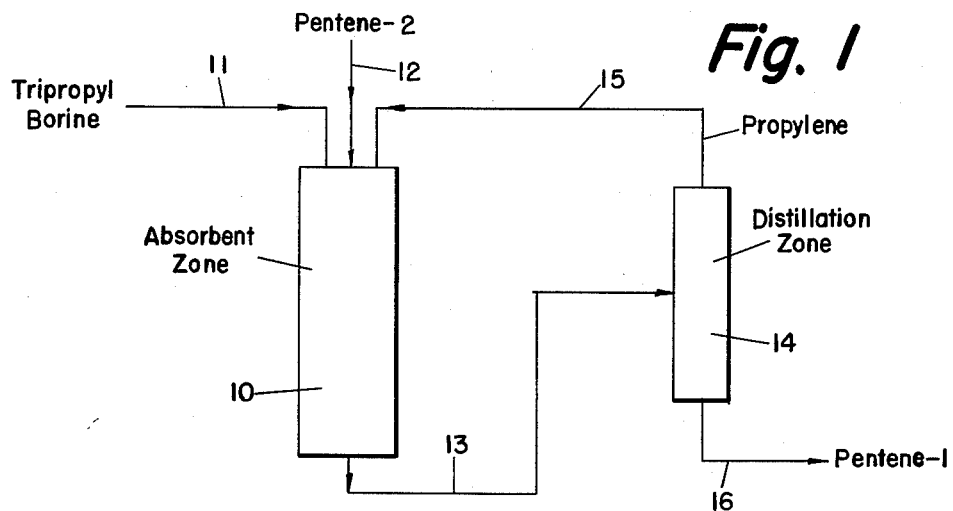
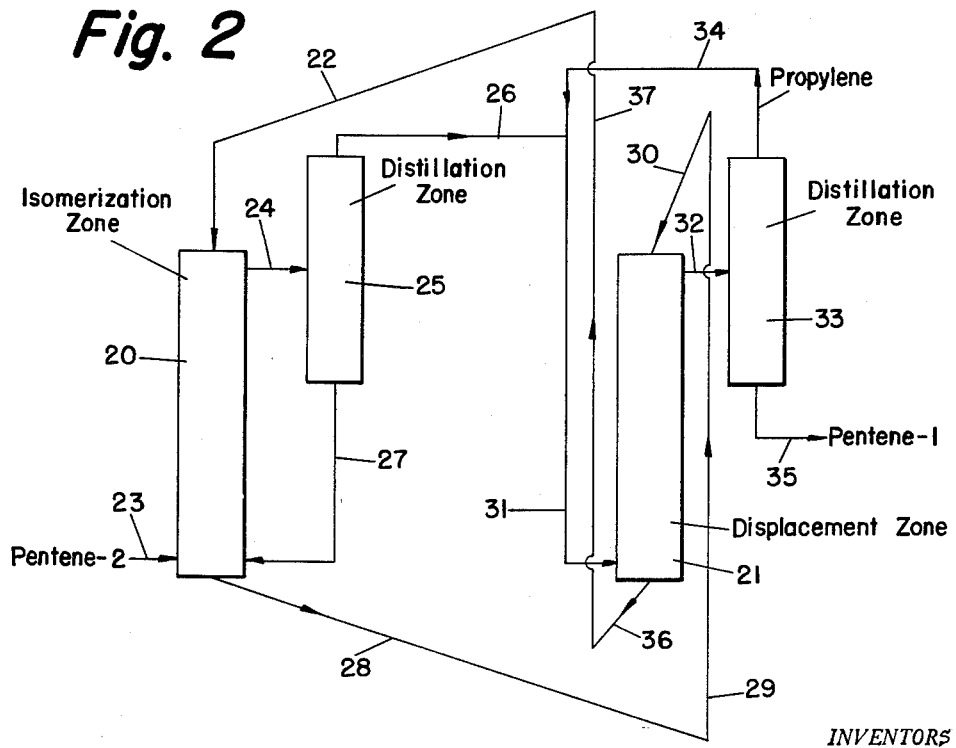

3,065,281
ISOMERIZATION OF NON-TERMINAL OLEFINS
Lewis W. Hall, Jr., Drexel Hill, and Charles L. Thomas, Swarthmore, Pa., assignors to Sun Oil Company, Philadelphia, Pa., a corporation of New Jersey
Filed Nov. 12, 1959, Ser. No. 852,243
10 Claims. (Cl. 260—669)

This invention relates to the isomerization of non-terminal olefinic compounds to convert the same to terminal olefins without change in skeletal structure.

Methods are known for catalytically polymerizing terminal or alpha-olefins to solid polymers of high molecular weight which are useful for making fibers, films or molded articles. However, attempts to produce high molecular weight solid polymers directly from non-terminal olefins have not been successful thus far. It is accordingly desirable to have available a procedure whereby an olefin which has an internal double bond can be converted to an alpha-olefin which can be utilized in polymerization or other reactions.

The present invention is directed to and provides an inexpensive method whereby non-terminal olefinic compounds can readily be converted to olefins containing a double bond at the alpha position. The invention is applicable to the isomerization of any $C_4$ to $C_{20}$ alkene in which the double bond is located at an internal position, provided that the double bond does not occur between two quaternary carbon atoms in the hydrocarbon chain. For example, olefins such as the following can be converted according to the invention to the corresponding alkene-1: butene-2; pentene-2; 2-methylbutene-2; 2,4-dimethylpentene-2; octene-4; 2,2,3-trimethylpentene-3; 4,4,5,5,-tetramethylhexene-2; octadecene-6; 3-metyl-7-ethylnonene-4; 2-cyclopentylbutene-2; 4-cyclohexylpentene-3; and the like. Low molecular weight polymers of propylene, such as the trimers and tetramers obtained by phosphoric acid type polymerization, are composed largely of internal olefins and are suitable charge materials for the present process. An alkene such as 2,2,5,5-tetramethylhexene-3 cannot be used in the present process since it has quaternary carbon atoms on each side of the double bond. The invention is particularly useful for isomerizing straight chain or singly branched alkenes having 4–10 carbon atoms per molecule.

The invention is also applicable to the treatment generally of arylalkenyl hydrocarbons and hydrocarbon derivatives having the generic formula:

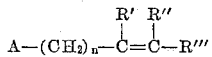

wherein A is an aryl group, R' and R" each are either hydrogen, aryl, alkyl or cycloalkyl groups, R''' is an alkyl group and $n$ is 0–20. The number of carbon atoms in the several R-groups is immaterial provided sufficient time is allowed for the above-mentioned rearrangement, but generally will be in the range of 1–20 carbon atoms each except when R' and R" are hydrogen. Also to shift the double bond all the way to a terminal position, at least one of the R-groups should constitute a chain portion that does not include a quaternary carbon atom. Examples of arylalkenyl compounds which can be isomerized by the present method are β-methyl styrene, 1-phenylbutene-1; 1-phenyl-1-methylbutene-1; 1-phenylpentene-1; 1-phenyl-1-methylpentene-2; 1-phenyl-1-ethylpentene-1; 1-phenylhexene-3; 1-phenyl-2-methylpropene-1; 1-phenyl-1,2-dimethylpropene-1; 1-phenyl-2,3,4-trimethylpentene-1; 1-phenyl-3-ethylhexene-4; 1-phenyldecene-1; 1-phenyl-3-cyclohexylpentene-3; analogous compounds in which diphenyl, naphthanyl or anthracyl groups are substituted for the phenyl groups; and numerous derivatives of all of the foregoing compounds containing such substituents on the aryl group as alkyl, halogen, ether or ester groups. The primary requirements of the starting arylalkenyl compound for application of the present method are that it conform to the above-specified generic formula and that any substituent groups present be essentially inert to the boron compound employed in effecting the isomerization under the reaction conditions used. The invention is particularly useful for isomerizing β-alkyl styrenes, such as β-methyl styrene, 1-phenylbutene-1, 1-phenylpentene-1 and the like.

In accordance with the invention a non-terminal olefinic compounds of the types described above is contacted at an elevated temperature with a granular, porous absorbent mass, e.g. alumina, containing a borine having the formula $BR_3$ wherein R is an alkyl group corresponding to an olefin having a boiling point differing from that of the desired terminal olefin product by at least 5° C. The number of carbon atoms in the R-group can be the same or more or less than that contained in the desired product provided that the olefin corresponding to R and the product differ in boiling point by at least 5° C. Preferably the boiling point difference is substantially greater than 5° C. to permit easy separation of the isomerization product by distillation as more fully described hereinafter. Most preferably, the R-group corresponds to a $C_3$—$C_6$ olefin, such as propylene, butene-1, pentene-1 or hexene-1. Contact between the absorbent mass containing the $BR_3$ compound and the starting olefin causes the latter to replace R-groups in the borine to form a different borine and release the olefin corresponding to R. The released olefin is removed from the absorbent mass and the latter is maintained at an elevated temperature for a time sufficient to isomerize the newly formed borine substantially to a primary borine. The absorbent mass containing the resulting primary borine is then contacted at an elevated temperature with the olefin corresponding to R, the molar amount of such olefin employed being in excess of three times the molar amount of the primary borine being treated. This causes the olefin corresponding to R to replace the hydrocarbon groups of the borine compound and release an alpha-olefin having the same number of carbon atoms and the same skeletal structure as the original non-terminal olefin. The released olefin is removed from the absorbent mass, and the latter containing re-formed $BR_3$ can then be re-used for treating a further amount of the charge olefin.

The reactions in the foregoing process can be illustrated by selecting pentene-2 as the starting olefin and propyl as the R-group in the borine compound carried by the absorbent. The process can be considered as involving the following:

(1) Initial reaction step: 3(pentene-2)+tripropyl B [on absorbent]→tri-2 and tri-3 pentyl B [on absorbent]+3-(propylene)
(2) Isomerization reaction step: tri-2 and tri-3 pentyl B [on absorbent]→tri-1 pentyl B [on absorbent]
(3) Pentene-1 displacement step: tri-1 pentyl B [on absorbent +3(propylene)→tripropyl B [on absorbent]+ 3(pentene-1)

From the foregoing it can be seen that there is no net consumption of the tripropyl borine in the process and that it can be continuously re-used. In step 1 propylene is formed and should be removed from the absorbent as it is released in order to drive the reaction in the direction desired. In step 2 sufficient time is provided to allow the borine compound to rearrange to a primary borine. This step can be consolidated with the preceding one by providing sufficient residence time in step 1. In step 3 pentene-1 is released and should be removed from the absorbent to force the reaction in the desired direction. Also the use of a large excess of propylene over the stoichiometric quantity aids in making the step 3 reaction proceed in the desired manner.

Referring again to step 1, the equation above shows the pentene-2 as replacing all of the alkyl groups in the tripropylene borine. However, it is not necessary for all of such groups to be replaced in order for the process to be operative. For example, the pentene-2 may replace only one of the propyl groups or two of the propyl groups to form borines having mixed hydrocarbon constituents. These will isomerize in step 2 in the same manner as the tripentyl borines by migration of the boron atom to the end position of the pentyl groups. Hence in step 3 pentene-1 will result in the same manner as shown above.

In practicing the invention each of the steps of the process should be carried out at elevated temperature, generally within the range of 110–300° C. and more preferably 140–200° C. When a temperature is used which is above the normal boiling point of the borine compounds involved in the operation, the reactions should be carried out under sufficient pressure to maintain the borine as absorbed or adsorbed liquid in the absorbent mass.

The invention is described more specifically in conjunction with the accompanying drawings wherein FIG. 1 is a schematic illustration of a system for conducting the process utilizing a stationary bed of absorbent and FIG. 2 is a schematic illustration of a system wherein the absorbent is continuously circulated between separate zones.

The system shown in FIG. 1 is described, for purpose of illustration, by considering pentene-2 as the starting olefin and tripropyl borine as the treating agent. The absorbent used can be any granular porous material which is non-reactive with borine compounds. Preferably it is a material having adsorptive properties for boron compounds, e.g. high surface area alumina, silica gel, magnesia, activated carbon or adsorptive clays. Also the absorbent can be a highly porous material having little or no adsorptive properties, such as diatomaceous earth or crushed fire brick. So-called molecular sieves, which are synthetic or natural zeolites having substantially uniform pore sizes, also can be employed as the absorbent.

Referring to FIG. 1, numeral 10 represents an absorbent zone containing a bed of granular absorbent, e.g. alumina. Prior to impregnation of the absorbent with the borine treating agent, any water and free oxygen in the absorbent should be carefully removed to prevent reaction with the borine compound. This can be done by heating the absorbent and applying reduced pressure thereto or purging with an inert gas such as nitrogen. Tripropyl borine is then introduced into zone 10, as illustrated by line 11, and the absorbent is thoroughly impregnated with the borine compound. The absorbent is then ready for use in the process.

An alternative method of preparing the absorbent in zone 10 comprises treating it, after it has been freed of water and free oxygen, with gaseous diborane. Preferably, a small amount of a Lewis base, such as ammonia, an ether, a thioether or an amine, is added to the diborane to aid its dissociation in the presence of the absorbent. For example, a small amount of trimethylamine or triethylamine can be added to to the diborane as it is introduced into zone 10. The diborane in dissociated state is taken up by the absorbent mass, and subsequently will be converted to tripropyl borine by reaction with propylene introduced into the absorbent zone.

Absorbent zone 10 is maintained at an elevated temperature in the range of 110–300° C., more preferably 140–200° C., in any suitable manner and pentene-2 at such elevated temperature is introduced into the zone in vapor form by means of line 12 and is contacted with the absorbent. If the temperature employed is above the normal boiling point of tripropyl borine, zone 10 is maintained under sufficient pressure to prevent vaporization of the tripropyl borine. Contact between the absorbent mass and pentene-2 causes the propyl groups of the borine compound to be displaced by pentyl groups, thus forming 2-pentyl and 3-pentyl borines and releasing propylene. The released propylene is removed from zone 10 by means of line 13 which leads to distillation zone 14. The absorbent mass is then maintained at an elevated temperature in the range of 110–300° C., more preferably 140–200° C., for sufficient time to cause the pentyl borines to isomerize to 1-pentyl borine. The time required will depend upon the temperature employed, with higher temperatures promoting the isomerization. Generally a time of at least one-half hour should be permitted and a considerably longer residence time, say up to 10 hours, can be allowed if desired.

Following the isomerization step, propylene is fed from line 15 into absorbent zone 10 in order to displace the pentyl groups from the borine compound. The molar amount of propylene introduced generally should be in excess of three times the molar amount of primary pentyl borine formed in zone 10. More preferably the propylene should be used in considerable excess, such as 9–30 mols per mol of the borine. This helps to force the reaction in the desired direction. Contact of the propylene with the borine compound causes the pentyl groups to be replaced by propyl groups and to form tripropyl borine and release pentene-1. The pentene-1 along with excess propylene passes through line 13 to distillation zone 14, wherein the mixture is distilled to remove propylene through line 15 and pentene-1 as a bottom product via line 16. When the pentene-1, as recovered from column 14, contains a substantial amount of unconverted pentene-2, the mixture can be distilled in a separate column (not shown) to recover the pentene-1 in the purity desired and the pentene-2 can be recycled to zone 10 for further treatment.

The embodiment of the process as above described utilizes, as the treating agent, a borine compound in which the R-group corresponds to an olefin which is lower boiling than the pentene-1 product. However, if desired, the process can be operated with a borine compound in which the R-group corresponds to an olefin that is higher boiling than pentene-1, for example, a hexene, heptene, octene, decene or a cyclic olefin that boils above pentene-1. In such case the pentene-1 product would be obtained from column 14 as the overhead distillate and the other olefin would be removed as a bottom product.

FIG. 2 illustrates a system which has an isomerization zone 20 and a displacement zone 21 through which the absorbent is continuously circulated. In the system as shown, the absorbent passes through each of these zones in the form of a compact moving bed. However, the process could also be operated by maintaining the absorbent in the form of fluidized beds in a manner analogous to the fluid bed type of catalytic cracking process.

In the process of FIG. 2, absorbent carrying tripropyl borine is continuously fed from line 22 to column 20 and passes downwardly therein as a moving bed countercurrent to pentene-2 which is fed through line 23 at the bottom. The incoming pentene-2 has been preheated to a sufficiently high temperature so as to maintain a temperature in column 20 in the range of 110–300° C., more preferably 140–200° C. Contact of the pentene-2 causes pentyl groups to displace the propyl groups from the borine on the absorbent and release propylene. This reaction can be promoted by introducing an excess of pentene-2 through line 23 to drive the reaction in the desired direction. From the upper part of the column a mixture of propylene and excess pentene is removed via line 24 and passes to distillation column 25 from which propylene is obtained through line 26 for re-use. The recovered pentene is recycled from the bottom of column 25 through line 27 back to isomerization zone 20.

The residence time of the absorbent in passing through zone 20 is sufficient to allow the 2-pentyl and 3-pentyl borines formed in the reaction to isomerize substantially to 1-pentyl borine. Generally a residence time of at least one-half hour should be provided for this rearrangement reaction to take place and a considerably longer time can be employed if desired. The absorbent carrying the newly formed borine compound is then transferred, as indicated by lines 28, 29 and 30, to the top of displacement zone 21. This transfer can be effected in any suitable manner such as by means of bucket elevators, but care should be taken to exclude air from contact with the absorbent to prevent reaction with the borine.

In displacement zone 21 the absorbent moves downwardly as a moving bed countercurrent to propylene which is fed into the bottom through line 31. The temperature in zone 21 should be maintained in the range of 110–300° C., more preferably 140–200° C. Contact between the absorbent and the propylene causes displacement of the pentyl groups in the borine by means of propyl groups to re-form tripropyl borine on the absorbent and release pentene-1. To effect this displacement reaction propylene should be fed to the base of column 21 in molar amount at least three times that of the borine compound present. Preferably a large excess of propylene is employed, for example, 9–30 times the molar amount of borine, to drive the displacement reaction toward completion. From the top of the column a mixture of pentene-1 and excess propylene is obtained in line 32, and the mixture is distilled in column 33 to obtain propylene as distillate which is recycled through line 34 for re-use in the system. Pentene-1 is removed from the column via line 35.

The absorbent carrying tripropyl borine is removed from the base of displacement column 21 and is transported, as indicated by lines 36, 37 and 22, back to the isomerization zone for further use in the process.

We claim:

1. Method of forming a terminal olefin from a non-terminal olefinic compound selected from the group consisting of (1) alkenes of 4–20 carbon atoms having an internal double bond which does not occur between two quaternary carbon atoms and (2) arylalkenyl compounds having the generic formula

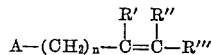

wherein A is an aryl group, R' and R'' each are selected from the group consisting of hydrogen, aryl, alkyl and cycloalkyl groups and R''' is an alkyl group which method comprises contacting said olefinic compound at a temperature in the range of 110–300° C. with a granular, porous absorbent mass containing a borine having the formula $BR_3$ wherein R is an alkyl group corresponding to an olefin having a boiling point differing from that of said terminal olefin by at least 5° C., whereby said olefinic compound displaces R-groups to form a different borine and releases said olefin corresponding to the R-group, removing the displaced olefin from the absorbent mass, maintaining the absorbent mass at a temperature in the range of 110–300° C. for a time sufficient to isomerize said different borine substantially to a primary borine, then contacting the absorbent mass at a temperature in the range of 110–300° C. with the olefin corresponding to said R-group in molar amount at least three times the molar amount of said primary borine to re-form $BR_3$, and removing from the absorbent mass a terminal olefin having the same number of carbon atoms as said non-terminal olefinic compound.

2. Method according to claim 1 wherein each of said temperatures is in the range of 140–200° C.

3. Method according to claim 2 wherein said R-group in $BR_3$ has 3–6 carbon atoms.

4. Method according to claim 1 wherein said non-terminal olefinic compound is an alkene.

5. Method according to claim 4 wherein said alkene is selected from the group consisting of straight chain and singly branched alkenes having 4–10 carbon atoms.

6. Method according to claim 1 wherein said non-terminal olefinic compound is an arylalkenyl compound.

7. Method according to claim 6 wherein said arylalkenyl compound is a β-alkyl styrene.

8. Method according to claim 1 wherein the absorbent mass comprises an absorbent selected from the group consisting of high surface area alumina, magnesia, silica gel, activated carbon, adsorptive clays, diatomaceous earth, crushed fire brick and zeolitic molecular sieves.

9. Method according to claim 1 wherein said non-terminal olefinic compound is selected from the group consisting of straight chain and singly branched alkenes having 4–10 carbon atoms and β-alkyl styrenes, each of said temperatures is in the range of 140–200° C., and said R-group in $BR_3$ has 3–6 carbon atoms.

10. Method according to claim 9 wherein the absorbent mass comprises an absorbent selected from the group consisting of high surface area alumina, magnesia, silica gel, activated carbon, adsorptive clays, diatomaceous earth, crushed fire brick and zeolitic molecular sieves.

References Cited in the file of this patent

UNITED STATES PATENTS

| | | |
|---|---|---|
| 2,886,599 | Kooster | May 12, 1959 |
| 2,952,719 | Appell | Sept. 13, 1960 |

OTHER REFERENCES

Chem. and Eng. News, vol. 37, pages 36 and 37, January 19, 1959.